United States Patent Office 2,743,403
Patented Apr. 24, 1956

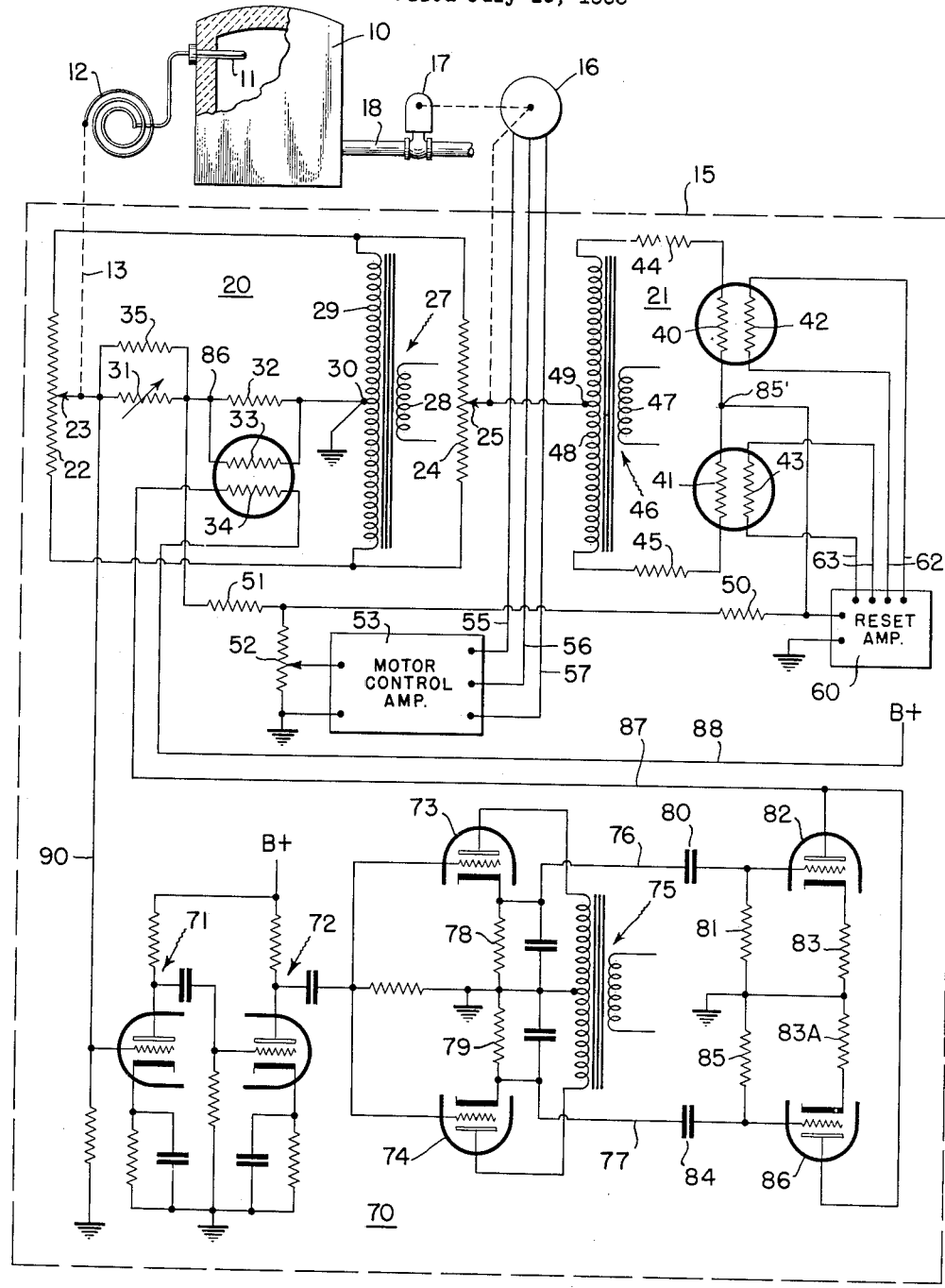

2,743,403
PROPORTIONAL BAND ADJUSTING SERVO SYSTEM

Roger F. Wernlund, Southampton, Pa., assignor to Minneapolis-Honeywell Regulator Company, Minneapolis, Minn., a corporation of Delaware Application July 15, 1953, Serial No. 368,189

8 Claims. (Cl. 318—29)

A general object of the present invention is to provide an improved measuring and control apparatus for effecting improved proportional control action. More specifically, the object of the present invention is to provide an improved controller of the proportioning type wherein the proportioning action will be automatically varied in accordance with the rate of change of a variable of a process which is under control.

Many industrial processes require that the process variables be accurately controlled. These variables may be such as pressure, temperature, flow, etc. with the accuracy of the control of these variables being an important factor in determining the character of the end product of the process. Proportioning controllers have been found to be very suitable for process control with the proportional controller generally taking the form of a balanceable apparatus wherein the magnitude of a process variable is used to introduce an unbalance into the controller and where the controller output provides both the controlling action to regulate the variable and a rebalancing action for the controller. The ratio of input unbalance action due to changes in the variable to output rebalance action of the controller is frequently referred to as the proportional band of the controller. Thus, if one unit of input unbalance is eliminated by one unit of output rebalancing action, the proportional band is considered as being one hundred per cent. If the controller proportional band has been changed so that one unit of input unbalance is eliminated by two units of rebalancing action, the proportional band is fifty per cent. By narrowing the proportional band of the controller, that is to say, reducing the percentage factor, it is possible to increase the controller sensitivity of response, or corrective action. However, if the proportional band is made too narrow, the controlling action approaches "on-off" action which is unstable and which will introduce hunting or oscillation of the controlled variable.

While accurate control requires high sensitivity, the process variables should not be allowed to oscillate or hunt. It has been found that if the controller proportional band is maintained at or near the point of instability it is possible to attain a higher degree of accuracy in the controlling action of the controller. It has been further found that if there is an instability in the process, the proportional band should be increased so as to reestablish stability in the control loop including the process.

It is therefore a more specific object of the present invention to provide an improved controller having an adjustable proportional band wherein changes in the measured variable will cause a widening of the proportioning band.

A further more specific object of the present invention is to provide a new and improved electrical controller which will proportionally adjust the proportioning band of a controller in accordance with the rate at which the magnitude of controlled variable changes.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

The single figure is a diagrammatic showing of one form of a process control which includes the present invention.

Referring to the drawing, the numeral 10 represents a furnace whose temperature is to be controlled. Sensing the temperature within the furnace 10 is a sensing element 11 which may be of the thermal fill type which is connected to a suitable spiral 12. The spiral 12 has an output connection 13 which will produce a desired controlling action in the controller of the present apparatus. The controller defined by the apparatus inside of the dotted line enclosure 15 is effective to respond to the signal from the spiral 12 and produce an output controlling action which is effective to drive a reversible motor 16 and a valve 17 to regulate the flow of a combustible material to the furnace 10 through a fuel supply conduit 18.

In the apparatus as set forth thus far, temperature variations in the furnace 10, detected by the sensing element 11, will introduce an unbalance into the controller 15. The controller will in turn produce an output controlling signal for the motor 16 and valve 17 which will result in corrective action being made on the flow of fuel passing to the furnace 10 so that the furnace temperature will be brought back to the desired value.

The electrical controller within the enclosure 15 is basically the same as the electrical controller disclosed and claimed in the copending application of Robert J. Ehret, entitled Electric Proportioning Control Apparatus with Automatic Reset, Serial No. 160,158, filed May 5, 1950, now Patent No. 2,694,169, November 9, 1954. Reference should be had to this copending application for details of the basic electrical circuit as well as the associated amplifiers. The controller 15 comprises a pair of network sections 20 and 21. The network section 20 is the proportioning section while the network section 21 is the reset section. The section 20 comprises an input potentiometer slidewire resistor 22 having an associated slider 23 which is arranged to be positioned by the connection 13 from the spiral 12. The section 20 also includes a followup or rebalancing slidewire resistor 24 having an associated slider 25 which is arranged to be positioned by the output action of the control motor 16. Power is supplied to the section 20 by way of the transformer 27 having a primary winding 28 and a secondary 29 which is tapped and grounded at 30. Connected between the slider 23 and tap 30 is an adjustable resistor 31 which may serve as a manual means for adjusting the proportional band of the controller. Also in the series connection is a resistor 32 which has a temperature sensitive resistor 33 connected in parallel therewith. The temperature sensitive resistor 33 is adapted to be heated by a heater 34. An ambient temperature sensing resistor 35 is connected in parallel with resistor 31.

The network section 21 comprises a pair of temperature sensitive resistors 40 and 41 which are arranged to be heated by a pair of cooperating heaters 42 and 43 respectively. Also included in the section 21 are a pair of fixed resistors 44 and 45. The power for this section is supplied by way of a suitable power transformer 46 having a primary winding 47 and a secondary winding 48 which is tapped at 49.

A pair of resistors 50 and 51 provide a voltage divider across the outputs of the two sections 20 and 21 and also provide a connection point for a potentiometer slidewire resistor 52 which is connected to the input of an amplifier 53. The output of the amplifier 53 is arranged to supply a driving signal for the motor 16 by way of the output leads 55, 56, and 57.

A reset amplifier 60 is also provided for resetting the controller by supplying heat to the heaters 42 and 43 by way of the conductors 62 and 63 respectively.

For sensing the presence of variations in the input signal to the controller, there is provided an amplifier 70 which comprises a pair of conventional amplifier stages 71 and 72 of the alternating current type which are coupled into the input of a phase discriminator comprising a pair of triodes 73 and 74. Power for the phase discriminator is supplied by a transformer 75 and the output from the phase discriminator is taken from leads 76 and 77. An output resistor 78 is connected between the cathode and ground of the triode 73 while a resistor 79 is connected between the cathode of triode 74 and ground. The potentials on these resistors will be dependent upon the amount of conduction of the respective triodes 73 and 74. The lead 76 is connected into the input of a rate taking network comprising a condenser 80 and a resistor 81. The output of this rate taking network is applied to the input of a triode amplifier 82 which has an unbypassed cathode resistor 83 connected thereto. The output lead 77 also goes through a rate taking network including a condenser 84 and a resistor 85. The output of this network is applied to the input of a triode amplifier 86 having an unbypassed resistor 83A in the cathode circuit thereof. The outputs of the triodes 82 and 86 are connected in parallel so as to supply heating current to the heater 34 by way of the leads 87 and 88, the latter of which is connected to a source of power for the triodes 82 and 86.

Considering now the operation of the apparatus, it is first assumed that the apparatus as shown in the drawing is in a balanced state. When balanced, the slider 23 will be in a center position on the slidewire resistor 22 and the slider 25 will be in a center position on the slidewire resistor 24. In addition, the resistance of the resistors 40 and 41 will be such that the voltages between their junctions at 85' and the center tap 49 on the secondary 48 will be zero. With this balance condition there will be no input signal applied to the input of the reset amplifier 60 since the voltage for the input of the amplifier 60 is derived from the position of the slider 25 on the slidewire resistor 24 as well as the voltage from the reset section 21. With no input on the input of the reset amplifier 60 the output of the amplifier will be balanced so that the heating effect of the resistors 42 and 43 will be the same and the values of the temperature sensitive resistors 40 and 41 will also be the same.

There will also be no input to the amplifier 53. This will be evident since the voltage applied to the input by way of resistor 50 is derived from a circuit that may be traced from the ground terminal 30 to slider 25, tap 49, junction 85, and resistor 50 to the input. As pointed out above, the voltage in this last traced circuit on the input of the reset amplifier was zero and therefore will be zero as concerns the amplifier 53. Further, since the slider 23 is in the center position, which corresponds to the center tap 30, there will be no voltage applied across the resistors 31 and 32 so that at junction 86 there will be no voltage and thus no voltage applied to the resistor 51 to the input of the amplifier 53. With no input applied to the input of the amplifier, there will be no output signal or controlling action tending to effect operation of the motor 16.

Since the slider 23 is centered on the slidewire 22, there will be no input applied by way of lead 90 to the input of the proportional band adjusting amplifier 70. With no input, there will be no effective output from the triodes 82 and 86 and there will be a minimum of heating of the resistor 34. With a minimum of heating on the resistor 34, the negative temperature coefficient resistor 33 will have a resistance which is relatively high. This high resistance has the effect of causing the junction point 86 to be electrically closer in potential to the potential conditions existing on the slider 23 than to the conditions at the grounded tap 30. The full effect of this will be discussed below.

If there should be an upset in the temperature within the furnace 10 so that the sensing element 11 will produce an output signal to move the slider 23 over the associated slidewire resistor 22, there will be an unbalance signal injected into the apparatus. The immediate effect of this unbalance signal will be to create an unbalance on the input of the amplifier 53 which will produce an output signal to drive the motor 16 in a direction to correct the temperature change of the furnace 10. This movement by the motor 16 will be effective to create a follow-up action in the network 20 by the movement of the slider 25 over the slidewire resistor 24. The motor 16 will be operative until such time as the slider 25 has been moved to eliminate the unbalance condition created by the movement of the slider 23. As soon as a balanced position has been reached, the amplifier 53 will become ineffective to drive the motor 16 and the apparatus will temporarily hold its position.

If the temperature condition is not corrected by the movement of the motor 16 so that the apparatus goes back to its originally assumed position, a further corrective action takes place in the reset network 21. As pointed out above, the only signals which are applied to the input of the amplifier 60 are derived from the position of the slider 25, and the signal from the reset section 21, with a deviation of the slider 25 from its center position introducing a control signal into the reset amplifier 60. The reset amplifier, which is a phase sensitive amplifier, will sense this unbalance and produce an output heating action on the heaters 42 and 43 in such a manner as to unbalance the reset section 21 in a direction or phase opposite to the unbalance created by the displacement of the slider 25 from its center position. As the heating action of the heaters 42 and 43 with respect to the associated sensing resistors 40 and 41 is relatively slow, the effect of the reset section 21 is not immediately felt in the control network. However, if the slider 25 remains displaced for a long enough period, the reset section 21 will slowly eliminate the unbalance on the input of the reset amplifier 60. If this rebalancing action of the slider 25 is completely eliminated by the reset section 21, the amplifier 53 will then sense only the unbalance signal present on the slider 23. If the slider 23 is not centered, there will be applied to the input of the amplifier 53 a control signal calling for further action of the motor 16 and there will be an accompanying movement of the motor until a balance condition is again reached by the movement of the slider 25 to a new position. When a balance condition is reached again, the reset section 21 will slowly eliminate the rebalancing action of the slider 25 and if the temperature within the furnace 10 does not come back to the desired value which is indicated by the slider 23 being centered on the slidewire resistor 22, the apparatus will again go through another operation to try to bring the temperature to the desired value.

Thus far explained, the apparatus is basically the same as that of the above mentioned copending Ehret application with the apparatus providing a controlling action which attempts to maintain the temperature within the furnace 10 exactly at a desired value.

As discussed this far, no consideration has been given to the effect of the heater 34 on the resistor 33 and the accompanying effect on the proportional action of the controller. It will be noted that when the resistors 32 and 33 are in parallel, with the resistor 33 cool, that the point 86 is effectively closer to the potential existing at the slider 23. With this point 86 closer in potential to that of the slider 23, the proportional band of the apparatus is narrow. In other words, a small movement of the slider 23, with the controller set to have a narrow proportional band, will require that the slider 25 be moved a considerably larger distance in attempting to effect the rebalancing of the input unbalance created by the slider 23. If the ratio of movement of the slider 23 and the slider 25 is one to one, the proportional band will be one hundred per cent, as mentioned above. The narrower the proportional band, the greater will be the output controlling action for a unitary change in magnitude of the sensing variable. As greater accuracy of control may be accomplished by a narrow proportional band, it is desirable that the point 86 normally be maintained at the potential which is closer to the slider 23. This will be accomplished as long as the net resistance of the parallel connected resistors 32 and 33 is relatively large.

As mentioned above, the narrow proportional band does tend to introduce instability into the apparatus so that if there is an indication of instability, it is desired to widen the proportional band. This widening action is accomplished in the present apparatus by the heater 34 heating the associated-negative temperature coefficient resistor 33 so as to decrease the effective resistance thereof. The decreasing of the resistance of the resistor 33 will cause the junction 86 to be effectively shifted in potential toward the ground tap 30 and thus broaden the proportional band of the apparatus.

As any movement of the slider 23 means there is instability of the measured variable, it is desired to use this indication to widen the proportional band by an amount dependent upon the rate of deviation. This is where the proportional band amplifier 70 becomes effective. The alternating current signal present on the slider 23 is applied by way of conductor 90 to the input of the proportional band adjusting amplifier 70. The signal will be amplified and, depending upon the phase thereof, will appear as an output signal on either the resistor 78 or 79. If the signals on the resistor 78 or 79 are steady and are not changing, the condenser 80 and the condenser 84 will effectively block the appearance of any signal on the heater control triodes 82 and 86. However, if there is a change in the potential on either the resistor 78 or 79, this change will be passed through the condenser 80, or the condenser 84, to the input of the amplifier triodes 82 and 86. A signal change on the input of the amplifier will be effective to cause one or the other of the triodes 82 or 86 to amplify and cause an appreciable amount of current to flow through the leads 87 and 88 and thus the heater resistor 34. The heating of the resistor 34 will decrease the resistance of the resistor 33 and the point 86 will be effectively shifted toward the grounded tap 30 and thus widen the proportional band of the apparatus.

It can thus be seen that the apparatus of the present invention will automatically adjust the proportional band of the apparatus in accordance with the rate of change of the input signal and that the controlling action will be proportional to that rate of change.

Under certain operating conditions, particularly near the end positions of the operation of the motor 16, it is possible to obtain a condition wherein the widening of the proportioning band will create a signal on the input of the amplifier 53 indicative of the need for a corrective action calling for movement of the valve toward its center position while in fact the instability is such as to cause the valve to move in the opposite direction. To eliminate the effect of this, the presence of the reset network is desirable. The reset network is effective to slowly introduce a corrective action which will always tend to move the valve to its desired position so as to cause the magnitude of the control variable to be at the desired value. This action may also be corrected by slowing down the proportional band adjusting rate by varying the amount of heat applied by the heater 34 to the resistor 33. It will be obvious that other forms of automatic reset may be incorporated in the apparatus without affecting the principles of operation of the present invention. Further, other methods of proportional band adjustment may likewise be effective in the present controller or in other types of proportional controllers.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. Apparatus for maintaining the magnitude of a variable at a desired value comprising, an electrical proportioning controller having an input and an output, variable sensing means connected to said input, variable control means connected to said output, electrical proportional band adjusting means connected to said controller to adjust the relation between the input action of said sensing means and the extent of output action of said variable control means in rebalancing said controller, and electrical means responsive to the rate of change of said variable for automatically adjusting said proportional band adjusting means.

2. In an electrical proportioning controller for maintaining the magnitude of a variable at a desired value, the combination comprising, proportional band adjusting means for said controller for adjusting the ratio of the extent of controller balancing to controller input, and electrical control means responsive to the rate of change of the magnitude of the variable for varying said proportional band adjusting means.

3. In a proportioning controller for maintaining the magnitude of a variable at a desired value, the combination comprising, proportional band adjusting means for said controller, electro-thermal means responsive to the rate of change of the magnitude of the variable for varying said proportional band adjusting means, and automatic reset means connected to said controller to eliminate any shift in the controller due to the variations of said proportional band adjusting means.

4. A proportional electrical controller for controlling the magnitude of a variable comprising, input signal producing means for said controller, output control means adjusted by said controller, input signal to output control action adjusting means, electrical rate of change responsive means responsive solely to the changes in the input signal producing means, and means including said electrical means for varying said adjusting means.

5. A proportional electrical controller for controlling the magnitude of a variable comprising, input signal producing means for said controller, output control means adjusted by said controller, adjusting means for varying the ratio of input signal action to output control action in said controller, electrical means responsive to the rate of change of said input signal, and means including said electrical means for varying said adjusting means.

6. Apparatus as defined in claim 5 wherein said electrical means comprises electrical rate taking circuit for producing a current flow proportional to the rate of change of the input signal.

7. Apparatus as claimed in claim 5 wherein said electrical means comprises a pair of input signal rate taking circuits for establishing an electrical current proportional to the rate of change of the input signal regardless of the sense or direction of the change of the input signal.

8. In an electrical controller of the proportioning type which is arranged for controlling the magnitude of a variable, the combination comprising, input signal producing means arranged for connection to said controller, output control means adjusted by said controller, adjusting means for varying the ratio of input signal to output control action of said controller, said adjusting means including a temperature sensitive resistor, input signal rate of change indicating means, and means including said rate of change indicating means for applying to said temperature sensitive resistor a heating action proportional to the rate of change of the input signal so as to vary the relationship between the input signal and the output controlling action of said controller.

References Cited in the file of this patent

UNITED STATES PATENTS

| | | |
|---|---|---|
| 2,336,994 | MacKay | Dec. 14, 1943 |
| 2,593,950 | Williams | Apr. 22, 1952 |
| 2,653,308 | Allen | Sept. 22, 1953 |
| 2,656,498 | Goodwin | Oct. 20, 1953 |
| 2,668,264 | Williams | Feb. 2, 1954 |